N. M. ROSENDAHL.
STREET FLUSHER AND OIL DISTRIBUTER AND SPRAYING MACHINE.
APPLICATION FILED JAN. 27, 1917.
1,357,592.
Patented Nov. 2, 1920.
4 SHEETS—SHEET 1.
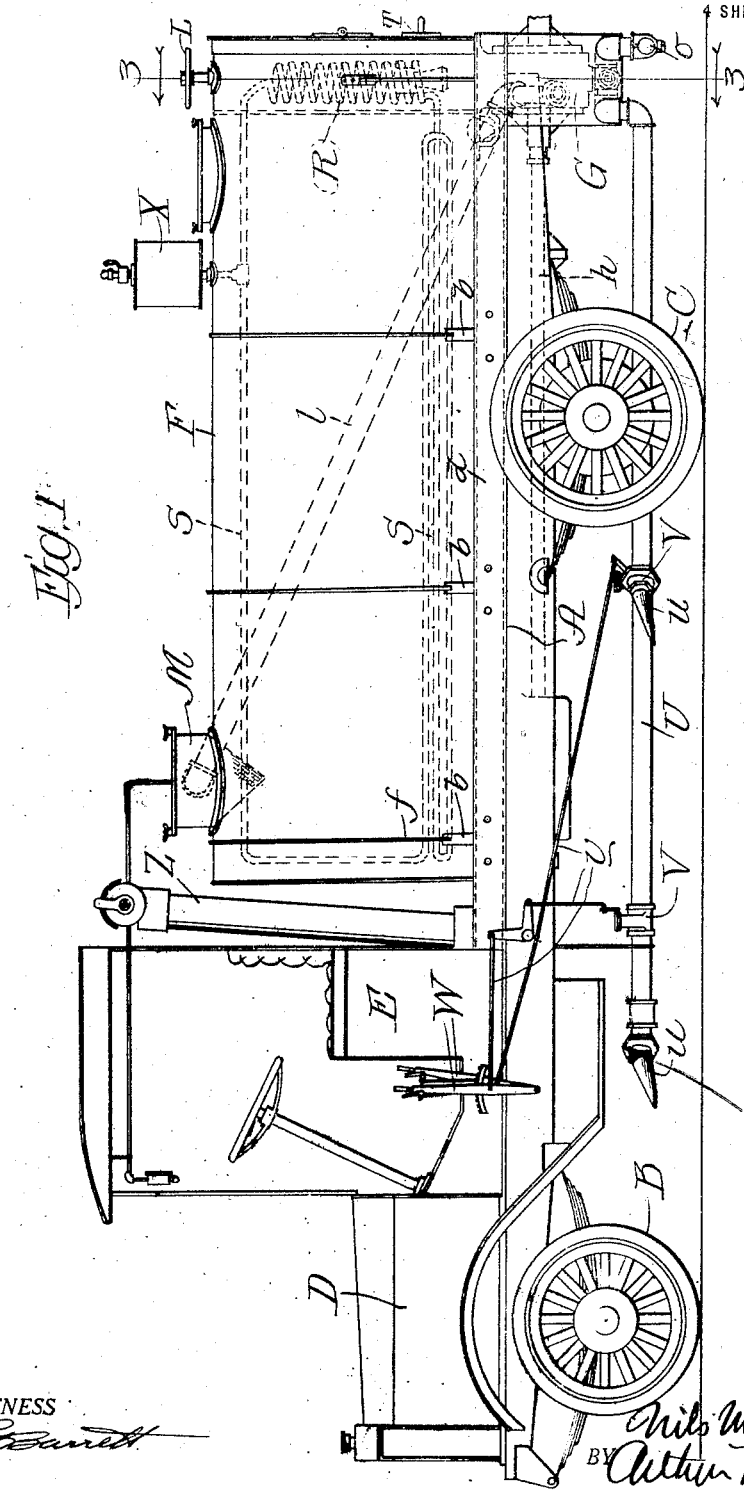
WITNESS
INVENTOR.
Nils M. Rosendahl
BY
ATTORNEY.

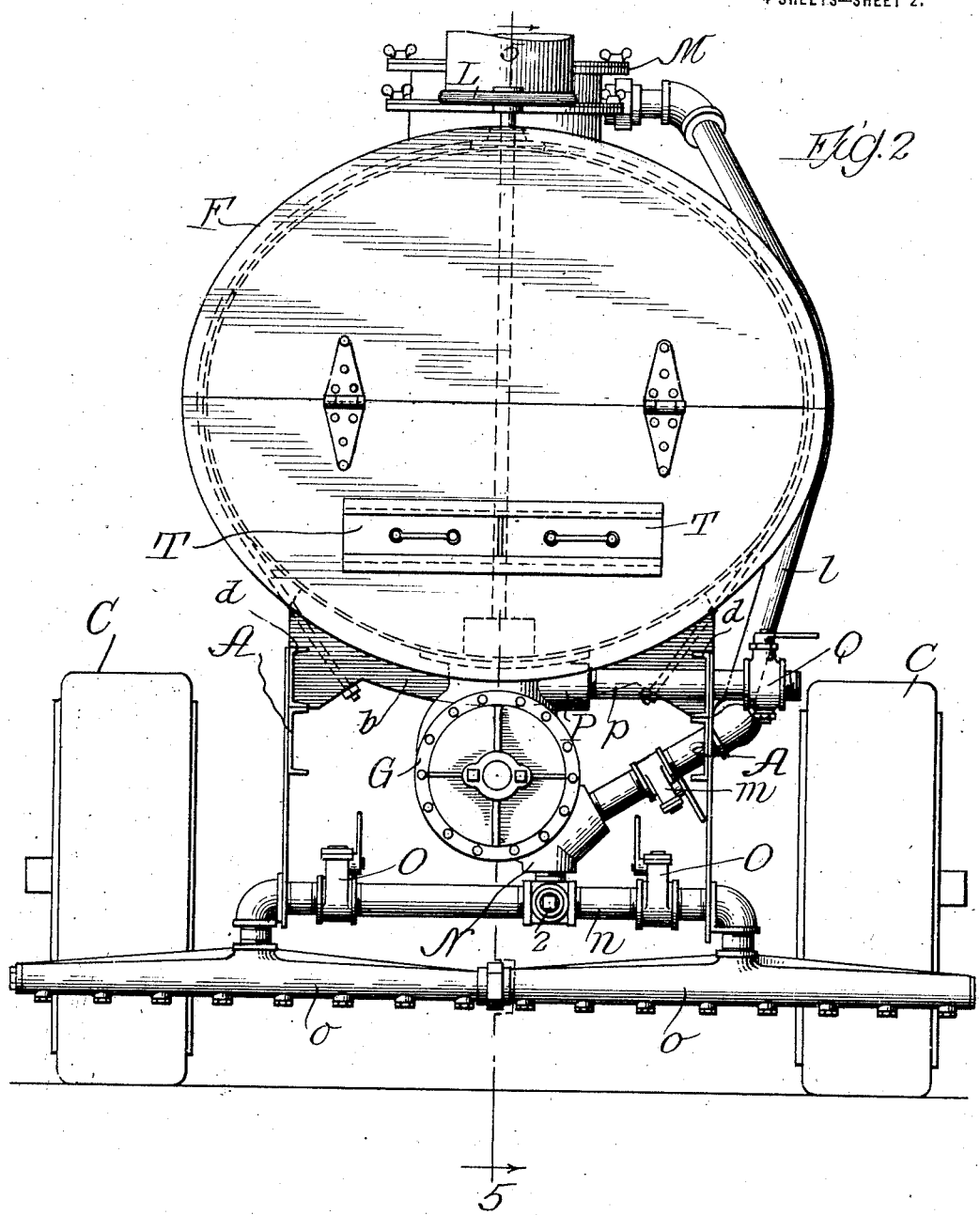

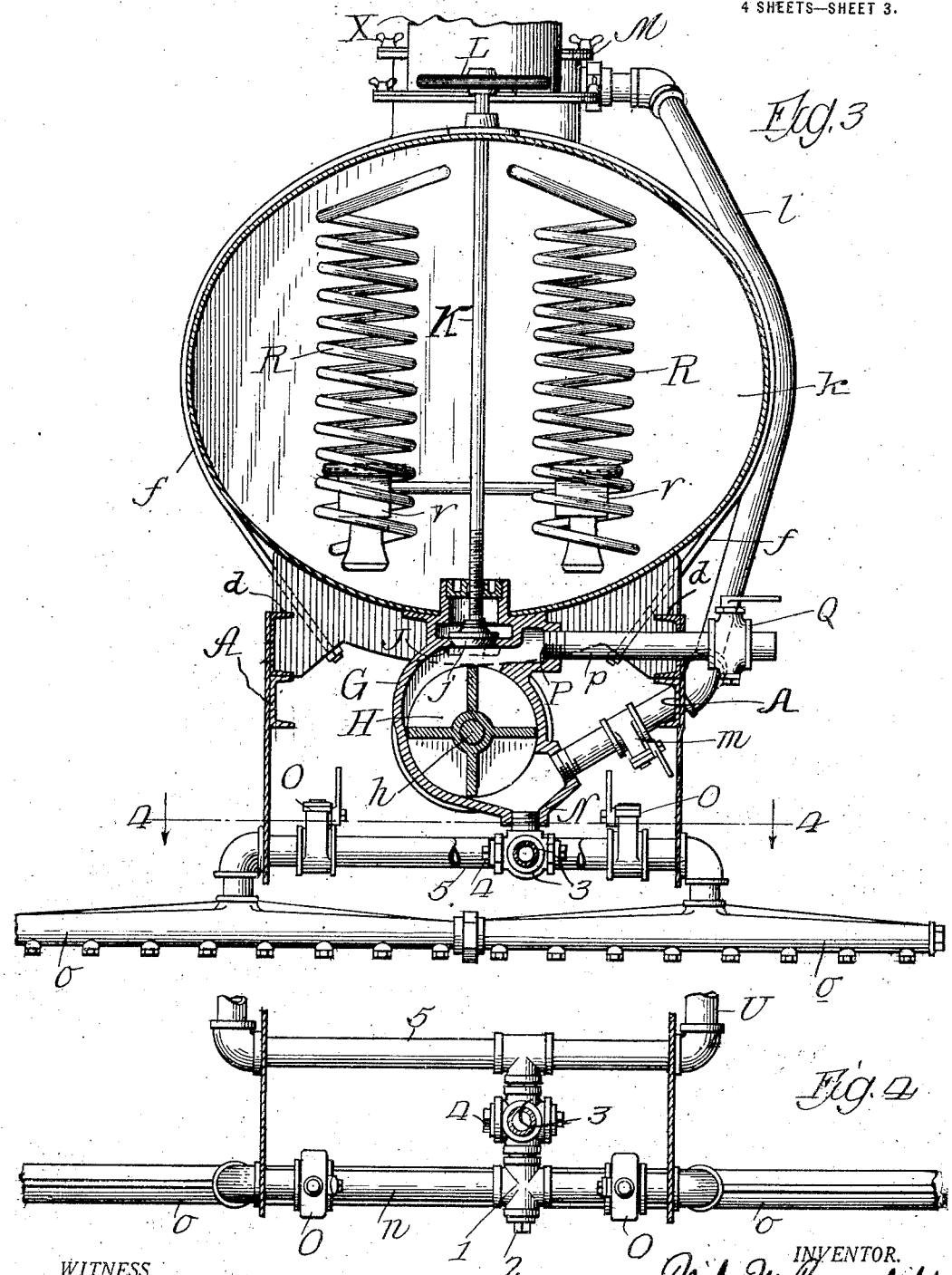

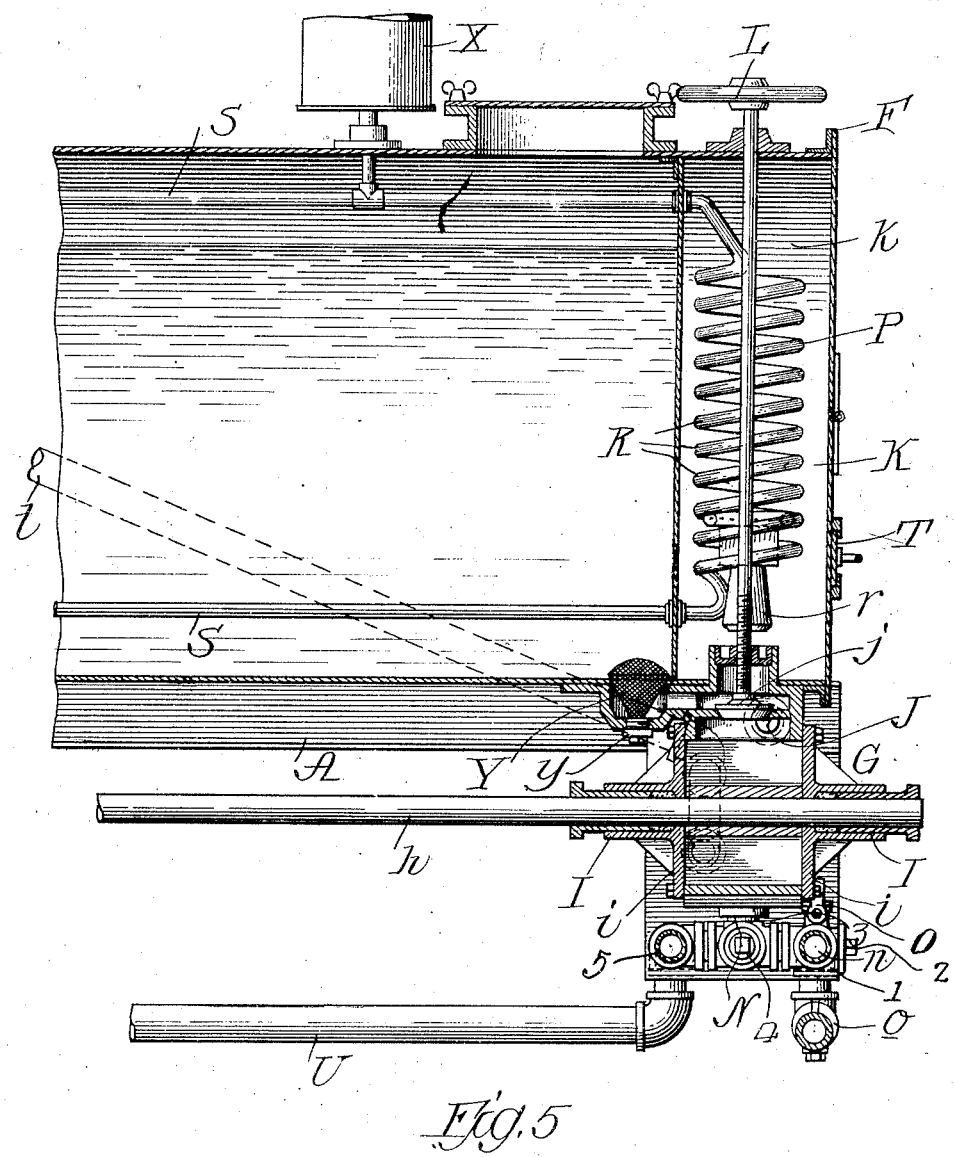

UNITED STATES PATENT OFFICE.

NILS M. ROSENDAHL, OF WINTHROP HARBOR, ILLINOIS, ASSIGNOR TO FREDERICK C. AUSTIN, OF CHICAGO, ILLINOIS.

STREET-FLUSHER AND OIL-DISTRIBUTER AND SPRAYING-MACHINE.

1,357,592.          Specification of Letters Patent.          Patented Nov. 2, 1920.

Application filed January 27, 1917. Serial No. 144,808.

*To all whom it may concern:*

Be it known that I, NILS M. ROSENDAHL, a citizen of the United States of America, and resident of Winthrop Harbor, Lake county, Illinois, have invented a certain new and useful Improvement in Street-Flushers and Oil-Distributers and Spraying-Machines, of which the following is a specification.

My invention relates to machines for distributing and spraying oil on streets, and flushing the streets with water, when such is necessary or desirable, the tank of the machine being adapted to contain either oil or water.

Objects of my invention are to provide a novel and improved machine of this general character; to provide an improved construction and arrangement of the devices for filling and discharging the tank of the machine; to provide an improved construction and arrangement of the means for heating the tank and the contents thereof; and to provide certain details and features of construction and combinations tending to increase the general efficiency and desirability of a street-flusher and oil-distributer and spraying-machine of this particular character.

To the foregoing and other useful ends, my invention consists in matters hereinafter set forth and claimed.

In the accompanying drawings:—

Figure 1 is a side elevation of a street-flusher and oil-distributer and spraying-machine embodying the principles of my invention.

Fig. 2 is a rear end elevation of said machine.

Fig. 3 is an enlarged section on line 3—3 in Fig. 1.

Fig. 4 is a detail horizontal section on line 4—4 in Fig. 3.

Fig. 5 is a longitudinal section on line 5—5 in Fig. 2, with the forward portion of the machine broken away and omitted for convenience of illustration.

As thus illustrated, my invention comprises a chassis having a frame A suitably mounted on front and rear wheels B and C, and having an engine inclosed in a hood D at the forward end thereof, together with a seat E, the general character of the vehicle being in the nature of an automobile truck. Suitable means are provided, of course, for controlling the front steering wheels, and for controlling the engine and the transmission thereof from the rear driving wheels.

The tank F is preferably cylindric in character, being disposed horizontally upon the chassis in rear of the driver's seat. At its rear end, this tank is provided on its under side with a casting G for inclosing the rotary pump H, which latter is operated by the main shaft $h$ leading to the engine. This shaft is preferably supported in front and rear stuffing boxes I carried on the front and rear closing plates $i$ of said casting. The top of this casting is provided with a valve-seat J which forms the discharge-outlet from the tank, and the valve $j$ is disposed above this seat and operated by the vertically disposed rod K leading upward through the chamber $k$ in the rear end of the tank, and provided at its upper end with a hand-wheel L for the operation of said valve. It will be understood that the rod K is screw-threaded and suitably mounted to cause it to move up and down when rotated by said hand-wheel, thus opening and closing the valve-opening leading from the tank into said casting. A by-pass pipe $l$ leads from the bottom portion of said casting G upward to the dome M on top of the tank, this pipe being provided with a valve $m$ to control the flow of the oil from the lower discharge-opening of the casting through the by-pass to the top of the tank. This lower discharge-portion N of the casting provides two separate outlets for the pump, and is also connected with a transverse pipe $n$ provided near its opposite ends with valves O, and with spray-nozzles $o$ for spraying or distributing the oil on the surface of the streets. The inlet-portion P of the casting is also connected with a horizontal and laterally projecting pipe $p$ having a valve Q, whereby the tank can be filled by closing the valves O and $j$ and opening the valves $m$ and Q, after suitably connecting the outer end of the pipe $p$ with a source of supply. After the tank is filled, the valves $m$ and Q can then be closed. By opening the valves O and *j*, the rotation of the pump in the casting will draw the oil from the tank and force it downward and outward through the spray-nozzles *o*, in a manner that will be readily understood. While the machine is standing still, and the valves O are closed, the oil can be kept in circulation and thereby prevented from solidifying, especially in cold weather, by opening the valve *m*, whereby the oil will be drawn from the tank and forced by the pump through the by-pass *l* to the top of the tank. Any suitable arrangement can be provided whereby the shaft *h* can be driven at will by the engine of the machine, and so that the pump can be started and stopped easily and without interfering with the operation of the driving-wheels C, in the usual and well-known manner.

In the chamber *k*, there are water-coils R heated by burners *r*, and these coils are connected with circulating pipes S which extend through the interior of the tank, as indicated in dotted lines in Fig. 1, thereby to heat the oil in the tank and keep it at the desired temperature. This heating apparatus is, therefore, preferably disposed at the rear end of the tank, in the manner shown, but the heating devices can be of any suitable, known or approved character, although hot water coils are found to be effective for this purpose. By arranging the burners at the rear end of the tank, in the manner shown, the valve connection between the tank and the pump-housing or casting is kept hot, thereby preventing clogging between the tank and pump. Rear doors T can be provided for this chamber *k*, to form the rear end of the tank, so that the burners and heating devices will be fully inclosed, but at the same time will be readily accessible when such is necessary.

Pipes U lead forward between the wheels C and have their rear ends suitably connected with the discharge-portion N of the casting, in front of the pipe *n*, and these pipes U are provided with flushing nozzles *u* of any suitable character. With this arrangement, and after filling the tank with water and closing all the valves *m* and O and Q, the machine can then be used for flushing the streets with water, the nozzles *u* being provided with valves V suitably connected by rods *v* with the hand-levers W suitably mounted and arranged at the side of the machine and within convenient reach of the driver.

When hot water is employed to heat the contents of the tank, an expansion reservoir X can be provided and suitably connected with the pipes S, so that the water, when heated, can expand in the usual and well-known manner.

It will also be seen that in the passage leading from the outlet opening of the tank to the valve there is a strainer Y, and directly below this a clean-out opening having a plug *y*, so that access can be had to said passage to flush it with gasolene and clean it out when it becomes clogged. This strainer and the opening directly above it in the forwardly extending portion of the valve-connection are in front of the valve, so that the valve is not in the bottom opening of the tank, but is disposed some distance in rear thereof, thus bringing the pump out from under the tank.

By opening and closing the valve *m* in the by-pass *l*, the pressure of the oil at the nozzles can be changed or varied. In other words, this by-pass can be opened to some extent by partially opening the valve *m*, and oil will then flow through the by-pass to the top of the tank, as well as out through the nozzles, but the pressure at the nozzles will be less than when the valve *m* is closed. In this way, the valve *m* and the by-pass provide a means for regulating the force of the discharge without changing or varying the speed of the pump.

It will also be seen that the tank F is supported on the frame A and removably secured thereto by bent rods *f* which have their ends suitably secured at opposite sides of the frame to the transverse bolsters *b* which are secured to the rolls *d* that rest on the chassis. The flushing or distributing or spraying apparatus, it will be seen, is all supported by the tank, through the medium of the casting G, so that when this tank is removed the entire apparatus is taken off, so that the truck can then be used in conjunction with the hydraulic hoist Z for other purposes.

The fitting 1 which connects the pipe *n* with the pump has a clean-out plug 2 at the rear end thereof, and this fitting is connected by another fitting 3 with the lower end of the discharge-portion N of the pump-housing, this second fitting having a valve 4 which can be turned to throw the discharge from the pump either into the pipe *n* or the pipe 5, which latter connects with the pipes U leading to the water-nozzles at the sides of the machine.

It will be understood, of course, that a separate motive power of any desired character can be used for operating the pump, if such is necessary or desirable, in any suitable manner.

A seat (not shown) can be suitably mounted on the rear of the machine and in such position that the occupant thereof can easily control the adjacent valves.

With the construction shown and described, the pump casing G has two separate and distinct inlets and two separate and distinct outlets, so that each connection to the pump is for a single purpose and is independent of the other connections. In this way, the connection 3 is for the single purpose of discharging the oil from the nozzles, while the pipe connection *l* is merely for the purpose of discharging oil from the pump into the tank and each connection is always employed for its particular or allotted purpose. In the same way, the connection between the top of the pump and the tank is merely for the purpose of discharging oil from the tank into the pump, while the connection *p* is for the single purpose of supplying oil to the pump from a source of supply, and neither connection is ever used for anything other than for its particular or allotted purpose. In this way, the construction is simplified and clogging is less liable to occur and other practical advantages are gained as well. The top of the pump is kept hot by the heat in the combustion-chamber K, and in this way the valve device in the top of the pump, and also the pump itself, are prevented from clogging and the heat of this chamber is also utilized to convey heat to the interior of the tank to heat the oil therein.

What I claim as my invention is:—

1. In a machine of the character described, a tank to contain liquid, a pump secured to the rear end of said tank, a valve-connection between said pump and tank, means for operating said pump to draw the liquid from said tank, said connection having a forwardly extending portion provided with an opening which forms the outlet for said tank, the valve being disposed at the top of the pump and in rear of said opening, with a wall of the tank extending transversely between the opening and the valve, and devices for discharging the liquid from the pump.

2. In a machine of the character described, a tank to contain liquid, a pump secured to the rear end of said tank, a valve-connection between said pump and tank, means for operating said pump to draw the liquid from said tank, said connection having a forwardly extending portion provided with an opening which forms the outlet for said tank, the valve being disposed at the top of the pump and in rear of said opening, with a wall of the tank extending transversely between the opening and the valve, and devices for discharging the liquid from the pump, said pump having a housing forming said connection, said means comprising a motor mounted on the machine, the upper portion of said housing having an inlet for connection to a source of supply, the lower portion of said housing being provided with a by-pass connection to the tank, with valves for said inlet and by-pass connection, whereby said pump may be used to either fill the tank or discharge the contents therefrom, or to circulate the liquid from the tank through the pump and back to the tank, the outlet from the tank being closed while said inlet and by-pass are open to fill the tank.

3. In a machine of the character described, a tank to contain liquid, a rotary pump secured directly to the rear end of said tank, a valve-connection between said pump and tank with the valve located in the top of the pump, means for operating said pump to draw the liquid from said tank, said pump having two separate outlets, devices connected to one outlet for discharging the liquid from the pump, and means whereby said pump may be used to fill the tank, when said valve-connection is closed, including a by-pass connection extending from said other outlet to permit circulation of the liquid from the rearward of the tank to the pump and back to the front end of the tank, and heating means above the valve to prevent clogging the inner passages.

4. In a machine of the character described, a tank to contain liquid, a pump secured to the rear end of said tank, a valve-connection forming an outlet between said pump and tank, means for operating said pump to draw the liquid from said tank, devices for discharging the liquid from the pump, said valve-connection comprising a valve-seat and movable valve-member therefor, said member having a rod extending upward through the rear portion of the tank, means to form a chamber around said rod to keep the liquid away, means for rotating the upper end of the rod, said rod being threaded to move up and down when rotated, thereby to open and close the valve-connection leading from the tank to the pump, a door for said chamber, and means to supply heat to said chamber.

5. In a machine of the character described, a tank to contain liquid, a pump secured to the rear end of said tank, a valve-connection between said pump and tank, means for operating said pump to draw the liquid from said tank, and devices for discharging the liquid from the pump, said tank having a heating-chamber at its rear end, to the bottom of which chamber said connection is secured, heating means in said chamber, close above said valve connection, so that said valve-connection will be heated, means to exclude the liquid from said chamber, and heating pipes extending through the interior of the tank from said heating means, whereby the contents of the tank also will be heated.

6. In a machine for distributing oil or other liquid on the streets, the combination of a tank to contain the liquid, having a combustion chamber at the rear end thereof, an outlet valve device disposed in the bottom of said chamber and connected to the tank to form an outlet for the liquid therein, so that the valve will be kept hot, means extending into said chamber to operate the valve, a pump connected to said valve device, a burner in said chamber, and nozzles connected to discharge the liquid drawn from the tank by said pump.

7. A structure as specified in claim 6, in combination with coils in said chamber and pipes connected with said coils to heat the liquid in said tank, the pump being close to said chamber, so that said burner has the double function of heating the contents of the tank and keeping the pump hot to prevent clogging.

8. A structure as specified in claim 6, the pump having a casing which incloses the valve, and an outlet in said casing immediately below the inner outlet opening of the tank, so that access may be had to the passage between the valve and the tank.

9. A structure as specified in claim 6, said valve device being in the top of said pump so that both will be kept hot to prevent clogging.

10. In an oil distributer, a tank for the oil, a pump depending from the bottom of said tank, means to control the flow of oil from the tank to said pump, thereby to draw off the oil, and means immediately above the pump to furnish heat to the tank and to keep the pump hot to prevent clogging.

11. A structure as specified in claim 10, said means including a combustion chamber to the bottom of which said pump is secured, so that the pump is outside of said chamber and easily accessible, and a shaft extending under the tank to operate said pump.

12. In an oil distributer, the combination of a tank to hold the oil, a pump having a casing formed with two inlets, one inlet having a pipe communicating with said tank and the other inlet having a pipe for connection with a source of supply to fill the tank, said casing having two separate outlets cast integral therewith, one outlet being above the other and connected by a pipe to the tank, and nozzles having a common feed pipe connected to the other outlet, so that each connection to said pump is for a single purpose and independent of the others, with the pump casing forming the coupling between all of said pipes, and a valve for each connection.

Signed by me at Chicago, Illinois, this 24th day of January, 1917.

NILS M. ROSENDAHL.